United States Patent

Vincent et al.

[11] 4,007,801
[45] Feb. 15, 1977

[54] SUSPENSION FOR VEHICLES

[75] Inventors: Charles R. Vincent, San Francisco;
William H. Albee, Pleasant Hill, both of Calif.

[73] Assignee: Crowley All Terrain Corporation, San Francisco, Calif.

[22] Filed: Feb. 6, 1976

[21] Appl. No.: 655,864

[52] U.S. Cl. .............. 180/74; 280/DIG. 7; 280/704
[51] Int. Cl.² ........................... B60K 23/00
[58] Field of Search .............. 180/74, 24.02; 280/DIG. 7, 702, 704; 301/5 R

[56] References Cited

UNITED STATES PATENTS

| | | | |
|---|---|---|---|
| 2,802,541 | 8/1957 | Albee | 280/DIG. 7 |
| 2,902,289 | 9/1957 | North | 180/24.02 |
| 2,990,026 | 6/1961 | Albee | 180/74 |
| 3,023,826 | 3/1962 | Larson | 180/74 |
| 3,275,091 | 9/1966 | Steck | 180/74 |
| 3,799,617 | 3/1974 | Holland | 280/DIG. 7 |
| R24,272 | 7/1955 | Albee | 180/74 |

*Primary Examiner*—Richard J. Johnson

[57] ABSTRACT

A suspension for off-road vehicles having a vehicle frame supported on flexible wall, fluid distensible rollers through a plurality of support rolls rotatably mounted to the frame. Each support roll contacts at least one roller, the axes of the rolls being parallel to the axes of the rollers and positioned vertically offset by an angle between 5° and 19° measured from the vertical. Means is also provided for positioning the rollers relative to the support rolls and maintaining a preselected contact pressure therebetween, these pressures being adjustable to accommodate various road and operating conditions.

12 Claims, 8 Drawing Figures

SUSPENSION FOR VEHICLES

This invention relates generally to vehicle drive and suspension systems particularly those adapted for use on off-road vehicles of a type having flexible wall, fluid distensible rollers and support rolls rotatably mounted to a vehicle frame. Each roller is pivoted to the vehicle frame by means of a yoke or pair of pivot arms, allowing the rollers to move vertically up and down to at least some degree while maintaining contact with the support rolls. Vehicles of this kind are described in U.S. Pat. Nos. 2,803,541; 2,990,026; 3,799,617 and others.

One common problem experienced in connection with these vehicles is that of maintaining contact pressure both between the rollers and the ground and between the rollers and the support rolls. Both conditions are essential to avoid slippage and excessive wear. The problem is especially troublesome when the vehicle traverses off-road terrain. Under such conditions, the vehicle may experience considerable bouncing, and as a consequence, the contact pressure may be substantially reduced, resulting in slippage and abrasion to the rollers. The problem is aggravated by higher speeds of travel and by the fact that the rollers are usually very large and inflated under low pressure.

Shock absorbers and other devices have been utilized to dampen excessive bouncing and to increase contact pressure between the rollers and drive rolls. However, no conventional or known system has been found effective to maintain the most desirable pressure contacts under a range of operating conditions.

It is, therefore, one purpose of the present invention to provide an improved suspension system including means for effectively reducing bounce and maintaining the most desirable contact pressures.

Another purpose of the invention is to provide an improved suspension system for vehicles of the kind described; to reduce slippage between contacts with the rollers; to maximize draw bar pull of a powered vehicle over various types of terrain; and to increase the efficiency of operation at various speeds, particularly while in use on off-road terrain.

Further objects of this invention will become apparent in view of the following detailed description and the accompanying drawings.

BRIEF DESCRIPTION OF THE DRAWINGS

In the drawings forming a part of this application, and in which like parts are identified by like reference numerals throughout the same.

Referring to FIG. 1 in particular, there is shown a vehicle 10 equipped with a suspension system as used with the present invention. The vehicle comprises a frame 11 supported by a pair of front rollers 12 and rear rollers 13. Means is provided for rotatably mounting each roller from the frame 11 while allowing relative vertical movement therebetween and a pair of front drive rolls 14 and rear idler rolls 15 support frame 11 upon rollers 12 and 13, respectively. Rollers 12 and 13 are each independently mounted in a yoke 16 pivotally connected to frame 11 through depending flanges 17. Thus, the means for rotatably mounting each roller comprises a yoke having a pair of generally parallel arms which straddle the roller and rotatably support the roller therebetween. This type of support or suspension system is itself well known.

Figure 1:
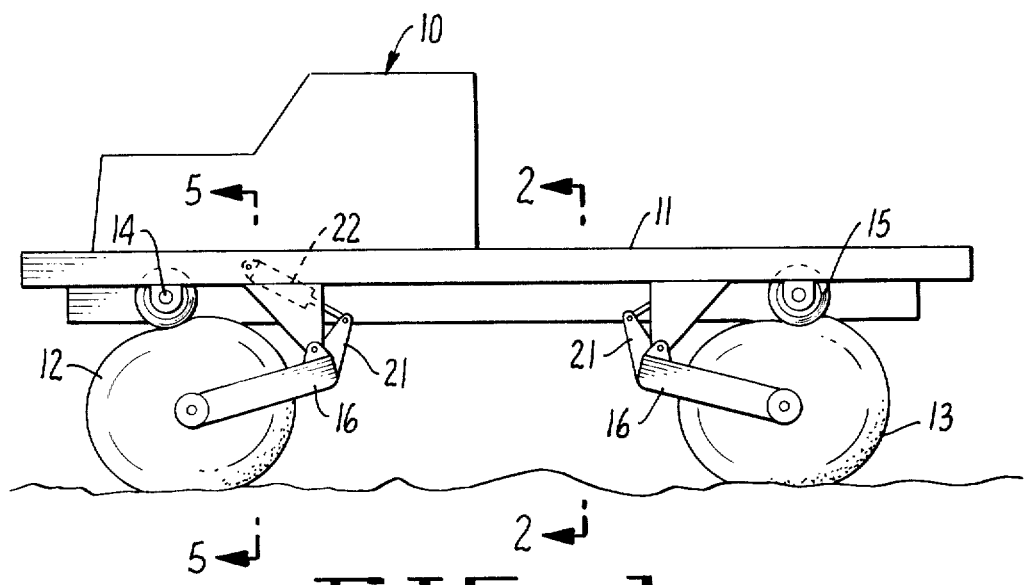
FIG. 1 is a side elevation of an off-road vehicle incorporating the present invention.
Figure 2:
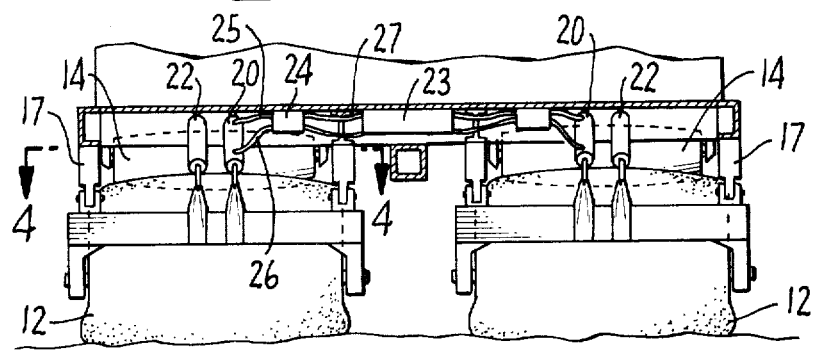
FIG. 2 is a section taken on lines 2—2 of FIG. 1.

In accordance with the present invention, vehicle 10 is further provided with means for resiliently biasing each roller relative to frame 11 to maintain a preselected contact pressure between the rolls and rollers. Means is further provided for selectively adjusting the contact pressures between the rollers and roll to accommodate various road and operating conditions. For these purposes, double-acting, hydraulic cylinders 20 are pivotally connected to frame 11, the piston rod of each cylinder being itself pivotally connected to an ear 21 mounted on a yoke 16 intermediate the ends of the supported roller. A plurality of shock absorbers 22 are similarly connected between the frame and yokes axially intermediate the rollers, respectively.

Each cylinder 20 is connected to a fluid-over-pneumatic accumulator 23 through a three-way control valve 24. A pair of high pressure conduits 25 and 26 connect each cylinder to valve 24; a third high pressure conduit connects valves 24 with the accumulator; and a fourth conduit 28 connects each valve with a fluid reservoir. In one position of operation, valves 24 connect one end of the cylinders to the accumulator and the opposite end to the reservoir; a second position fluidly connects the opposite end to the accumulator and the one end to the reservoir; and the third position connects both ends to the accumulator.

With the apparatus described, it will be apparent that valves 24 may be controlled to actuate cylinders 20 and pivot yoke 16 in either direction or simply maintain a neutral position. In one direction of pivot, rollers 12 and 13 are forced against their supportive rolls 14 and 15. However, a reverse operation of cylinders 20 will pivot the yoke 16 in a direction that relieves the pressure between rolls and rollers. A portion of the load upon the vehicle is thereby transmitted through the cylinders 20 and yokes 16.

Figure 6A:
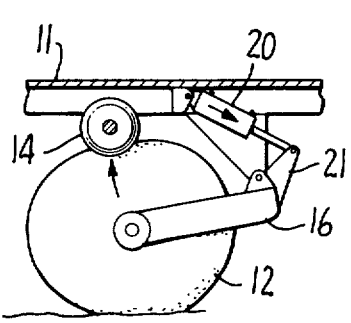
FIGS. 6a, 6b and 6c are fragmentary elevations illustrating various conditions of the suspension system during normal operation of the vehicle.
Figure 6B:
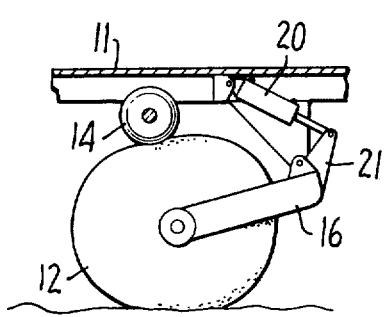
Figure 6C:
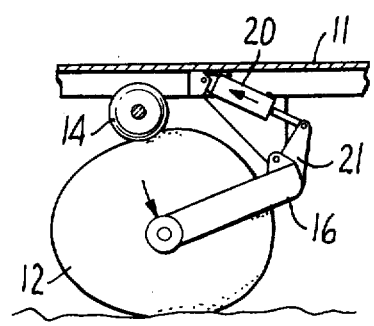

Various conditions of operation are illustrated in FIGS. 6a, 6b and 6c. Under conditions of minimum load, it may be desirable to increase the contact pressure between roll 14 and roller 12. Accordingly, cylinder 20 is actuated to move the roller 12 in the direction of roll 14. The resultant increase in contact pressure reduces the chance of slippage and the resultant abrasion to the roller. FIG. 6a illustrates an operation of cylinder 20 to accomplish this result.

FIG. 6b illustrates a condition where a fluid cylinder 20 is used merely as a shock absorber. This is accomplished by connecting both ends of the cylinder to the accumulator 23.

A third condition of operation is exemplified by FIG. 6c wherein cylinder 20 is operated to reduce the pressure between roll 14 and roller 12. This type of operation is contemplated where heavy loads are being carried by the vehicle. Although such condition of operation presents no problem in maintaining contact between drive roll 14 and roller 12, unusually heavy loads may produce severe and undesirable distortions of the roller. This condition may be alleviated or eliminated by shifting a part of the load to the yoke 16, as shown.

Accumulator 23 maintains a preset pressure load in the cylinders 20 while also allowing the cylinders to absorb bounces of the vehicle. The pressure within accumulator 23 is regulated and set to provide the optimum pressure for both cushioning the vehicle suspension system and sustaining a load through the cylinders.

Figure 3:
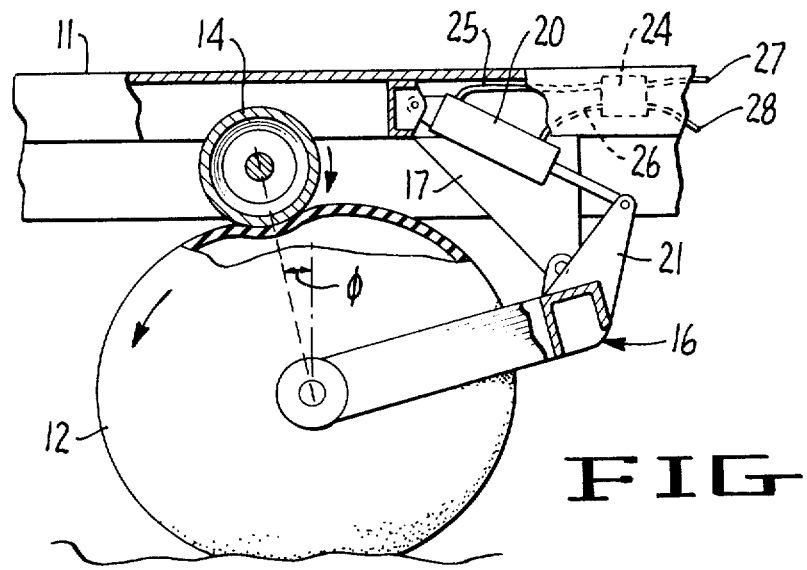
FIG. 3 is an enlarged elevation of one fluid distensible roller and support roll of the vehicle.
Figure 4:
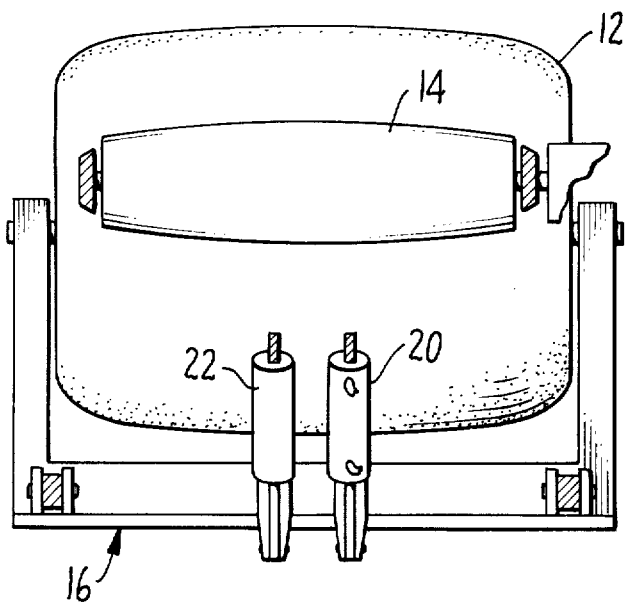
FIG. 4 is a section taken on lines 4—4 of FIG. 2.
Figure 5:
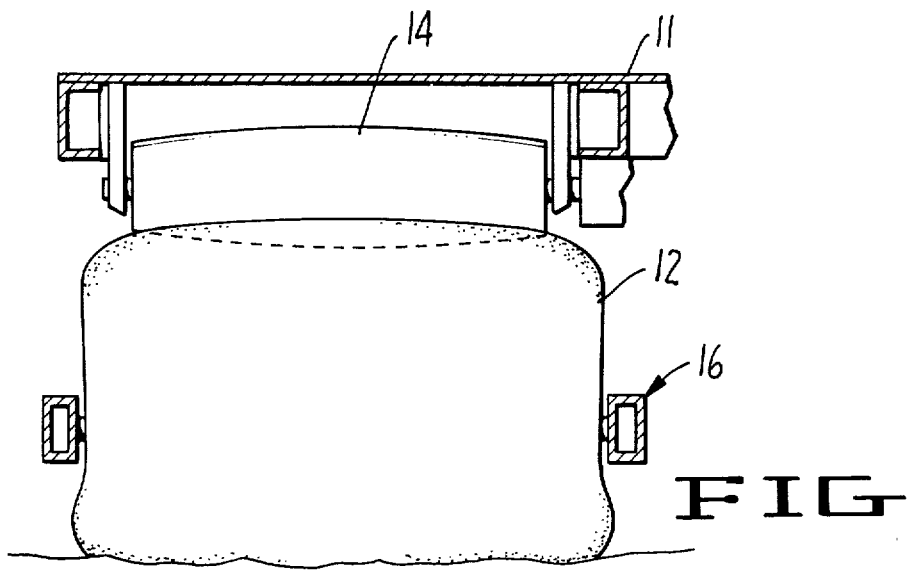
FIG. 5 is a vertical section taken on lines 5—5 of FIG. 1.

The present invention further contemplates locating each drive roll 14 in advance of its contacted roller 12. Referring to FIG. 3 in particular, each drive roll is located vertically ahead of or in advance of the contacted roller 12 by an angle between 5° and 19° measured from the vertical. This is shown by the angle $\phi$. It has been found that such a relationship between the drive roll and roller obviates the undesirable condition known as "bullfrogging". Conventional practices have normally positioned the drive roll directly or vertically above the axis of the roller and under certain speeds or conditions of travel, the drive roll will tend to distort the roller, forcing the rear half forward and enlarging the front half producing the appearance of a "bull frog". This condition may become so severe that the drive roll periodically loses contact with the roller, resulting in roller abrasion and inefficient drive transmission. These problems, it has been found, are largely overcome by relocating the drive roll in the manner described. It has been also determined empirically that the optimum angle of vertical offset is approximately 13°, although dramatic improvement is produced with an offset between 5° and 19°.

The condition referred to as "bullfrogging" may also be experienced with undriven rolls or idler rolls. However, in this instance, the bullfrogging occurs on the back half of the roller. It would appear that under these conditions the roll serves as an impediment or obstacle to the passage of the roller beneath, thereby causing the roller to bulge directly in back of the roll. In any event, it has been determined that the problem of roller distortions can be controlled and limited by offsetting the rolls vertically to the rear of the roller axis by an angle between 5° and 19°, resulting in an improved operation of the vehicles.

Although a preferred embodiment of the invention has been illustrated and described, various modifications and changes may be made or resorted to without departing from the spirit of the invention or the scope of the appended claims and each of such modifications and changes is contemplated.

What is claimed is:

1. A vehicle for travel over off-road terrain, said vehicle having a frame; a fluid distensible roller engageable with the ground; means for rotatably mounting said roller to said frame while allowing relative vertical movement therebetween; a support roll rotatably mounted to said frame and positioned generally above said roller to contact said roller and be supported thereon, the axis of said roll being parallel to the axis of said roller and positioned vertically offset by an angle between 5° and 19° measured from the vertical; means including a fluid cylinder for resiliently biasing said roller relative to said frame to maintain a preselected contact pressure between said roll and roller; and means for selectively adjusting the contact pressures between said roller and roll to accommodate the various road and operating conditions.

2. The vehicle of claim 1, said roll being power driven, the axis of said roll being positioned between 5° to 19° in advance of said roller.

3. The vehicle of claim 1, said means for rotatably mounting said roller to said frame comprising a yoke pivotally connected to said frame, said yoke having a pair of generally parallel arms straddling said roller and rotatably supportive thereof.

4. The vehicle of claim 3, said fluid cylinder being connected between frame and yoke axially intermediate the ends of said roller.

5. The vehicle of claim 4, and further comprising a shock absorber connected between said frame and yoke axially intermediate the ends of said roller.

6. The vehicle of claim 1, the axis of said roll being positioned approximately 13° in advance of said roller axis.

7. The vehicle of claim 1, said means for selectively adjusting the contact pressures comprising a control valve, pressure conduit means connecting said valve to said fluid cylinder, a fluid-over-pneumatic accumulator, and pressure conduit means connecting said valve to said accumulator.

8. A vehicle for travel over off-road terrain, said vehicle having a frame; fluid distensible rollers engageable with the ground; means rotatably mounting said rollers to said frame while allowing relative vertical movement therebetween; support rolls rotatably mounted to said frame and positioned generally above said rollers to contact said rollers, respectively, and be supported thereon; and means for resiliently biasing said rollers relative to said frame and support rolls to maintain preselected contact pressures between said rolls and rollers, said means comprising fluid cylinders for resiliently biasing each roller to maintain a preselected contact pressure between each roller and its supported support roll, and means for selectively adjusting the fluid pressure applied to said cylinders to accommodate various road and operating conditions.

9. The vehicle of claim 8, said means for rotatably mounting each of said rollers to said frame comprising a yoke pivotally connected to said frame, said yoke having a pair of generally parallel arms straddling said roller and rotatably supportive thereof.

10. The vehicle of claim 9, said fluid cylinder being connected between frame and yoke axially intermediate the ends of said roller, and further comprising a shock absorber connected between said frame and yoke axially intermediate the ends of said roller.

11. The vehicle of claim 8, said means for selectively adjusting the fluid pressure applied to each of said cylinders comprising a control valve, pressure conduit means connecting said valve to said fluid cylinders, a fluid-over-pneumatic accumulator, and pressure conduit means connecting said valve to said accumulator.

12. The vehicle of claim 8, said fluid cylinders being double acting for applying either negative or positive contact pressures between the rollers and support rolls.

* * * * *